(12) United States Patent
Ng et al.

(10) Patent No.: US 6,470,261 B1
(45) Date of Patent: Oct. 22, 2002

(54) AUTOMATIC FREEWAY INCIDENT DETECTION SYSTEM AND METHOD USING ARTIFICIAL NEURAL NETWORK AND GENETIC ALGORITHMS

(75) Inventors: Yew Liam Ng, Singapore (SG); Kim Chwee Ng, Singapore (SG)

(73) Assignee: CET Technologies PTE LTD (SG)

( * ) Notice: Subject to any disclaimer, the term of this patent is extended or adjusted under 35 U.S.C. 154(b) by 0 days.

(21) Appl. No.: 09/743,992

(22) PCT Filed: Jul. 6, 1999

(86) PCT No.: PCT/SG99/00067
§ 371 (c)(1),
(2), (4) Date: Jan. 16, 2001

(87) PCT Pub. No.: WO00/07113
PCT Pub. Date: Feb. 10, 2000

(30) Foreign Application Priority Data

Jul. 31, 1998 (SG) .......................................... 9802830-1

(51) Int. Cl.[7] .............................. G06G 7/76; G06N 3/02
(52) U.S. Cl. ........................ 701/117; 701/301; 340/901; 340/905; 340/425.5; 706/13; 706/15
(58) Field of Search .................... 701/117–119, 301, 701/302; 340/901, 903, 905, 425.5; 706/15, 13

(56) References Cited

U.S. PATENT DOCUMENTS 6,226,389 B1 * 5/2001 Lemelson et al. .......... 382/104
6,275,773 B1 * 8/2001 Lemelson et al. .......... 701/301

* cited by examiner

Primary Examiner—Yonel Beaulieu
(74) Attorney, Agent, or Firm—Haynes and Boone, LLP

(57) ABSTRACT

Design of a neural network for automatic detection of incidents on a freeway is described. A neural network is trained using a combination of both back-propagation and genetic algorithm-based methods for optimizing the design of the neural network. The back-propagation and genetic algorithm work together in a collaborative manner in the neural network design. The training starts with incremental learning based on the instantaneous error and the global total error is accumulated for batch updating at the end of the training data being presented to the neural network. The genetic algorithm directly evaluates the performance of multiple sets of neural networks in parallel and then use the analyzed results to breed new neural networks that tend to be better suited to the problems at hand.

20 Claims, 5 Drawing Sheets

AUTOMATIC FREEWAY INCIDENT DETECTION SYSTEM AND METHOD USING ARTIFICIAL NEURAL NETWORK AND GENETIC ALGORITHMS

FIELD OF THE INVENTION

The invention relates generally to artificial neural networks and, more specifically, to an implementation of an automatic freeway incident detection system using artificial neural networks and genetic algorithms.

BACKGROUND OF THE INVENTION

In the management of traffic on a freeway, much effort has been concentrated on improving traffic safety and efficiency by improving use of the existing road network through homogenized traffic flow and avoidance of critical situations for the individual driver. Unexpected disturbances in the existing road network are usually caused by incidents such as traffic delays, accidents, disabled vehicles, spilled loads, maintenance, and other events that disrupt the normal flow of traffic. This results in a reduction of the capacity of the road network. "Incidents" are defined as non-recurring events that deteriorate road safety conditions. In order for a traffic management system to be effective, it must be capable of detecting unexpected disturbances, for example, through use of an automated incident detection systems, in a manner that is both reliable and quick to respond.

Automated incident detection systems have typically included two major components, which are a traffic detection system and an incident detection algorithm. The traffic detection system, which is part of the traffic management scheme, acquires current traffic data. The incident detection algorithm interprets the data acquired by the traffic detection system and ascertains the presence or absence of incidents or non-recurring congestion. Usually, the detection of traffic incidents is based on observing specific discontinuities in the traffic data and the incident detection algorithm is highly dependent on the traffic detection system. Accordingly, the accurate and quick detection of the occurrence and location of unexpected traffic flow disturbances is vital for traffic surveillance, as is the design of neural networks used in detection algorithms for interpreting the detected traffic data. In particular, improvements in these areas are continually being sought so that motorists may be informed by real-time traveler information services employing this technology to allow for alternate routing of traffic and timely dispatch of emergency services.

A number of incident detection algorithms had been proposed from a variety of theoretical foundations over last two decades. They range from comparative or pattern comparison algorithms to the artificial intelligent type. However, their structures vary in different degree of sophistication, complexity and data requirements. The existing algorithms such as California, MacMaster and Minnesota Algorithms are classified as comparative methods and they have some design uncertainties and difficulties, especially in deciding threshold values when there is a lack of heuristic knowledge. The artificial intelligence type neural network proposals have been shown to be a promising approach but these types suffer from being mostly manually designed in an ad-hoc manner.

Therefore, what is needed is an automatic freeway incident detection system that incorporates improved neural network design capabilities in the incident detection software for more efficient and accurate detection of freeway incidents.

SUMMARY OF THE INVENTION

The present invention relates to the design of a neural network ("NN") for automatic detection of incidents on a freeway. A NN is trained using a combination of both back-propagation and genetic algorithm-based methods. The back-propagation and genetic algorithm work together in a collaborative manner in the NN design. A gradient-guided back-propagation method employs a fast leaning technique that utilizes both incremental and batch learning techniques. The training starts with incremental learning based on the instantaneous error and the global total error is accumulated for batch updating at the end of training data being presented to the NN. The genetic algorithm directly evaluates the performance of multiples sets of NNs in parallel and then uses the analyzed results to breed new NNs that tend to be better suited to the problems at hand. Both global and local search capabilities are enhanced in this hybrid system, in which back-propagation training provides the local search and the genetic algorithm explores the global. Such a systematic and reusable artificial intelligence computing paradigm focuses on design automation.

In one embodiment, the presence or absence of incidents of traffic congestion at selected time instances are identified by first acquiring and storing traffic data. At least one neural network is used for evaluating the traffic data to determine the incident status for a particular time instance. The neural network is updated utilizing both back propagation and genetic algorithm techniques for optimizing the design of the neural network.

In another aspect, traffic data is stored in a data server and simulated traffic data is generated therefrom with predefined incident occurrences, such that the simulated traffic data is used as input in optimizing the design of the updated neural network.

The traffic data used can be formatted as rows of data set instances that include incident status, traffic volume at time instances collected at an upstream traffic measurement station, occupancy at time instances collected at an upstream traffic measurement station, traffic volume at time instances collected at a downstream measurement location, and occupancy at time instances collected at a downstream traffic measurement location.

Updating the neural network can be accomplished by first generating an initial population of neural network design candidates encoded in chromosomes, each candidate being assigned with a fitness value obtained from evaluation of performance. The initial neural network design candidates are ranked from best to worst and a global record is maintained of the best fitness neural network design candidate. Mating population selection operations are performed, followed by crossover and mutation operations on the selected neural network design candidates to generate a new population of neural network design candidates, so that a global search has been executed via the rank-based selection, crossover and mutation operations. A back propagation training operation is then performed on the neural network design candidates, so that a local search has been executed and weights of the neural network's connections are modified to generate a new population of neural network design candidates. The fitness of the back-propagated neural network design candidates are evaluated and a fitness value is assigned thereto. Then a generation gap operation is performed that selects candidates from the new population and previous populations of neural network design candidates that will survive into the next evolution. The evolution process of genetic reproduction is repeated until a stop criterion is reached.

A technical advantage achieved with the invention is the reduction of the design time of NNs compared to the traditional neural-genetic design means, the latter of which are lacking in diversified exploring capabilities. Another advantage is the ability to handle longer chromosome lengths by virtue of being equipped with the neighborhood search capability using a gradient-guided local search technique, which derives naturally from the traditional training, i.e. the back-propagation training. This ameliorates the typical circumstance that as the chromosome length increases, the search space will increase exponentially leading to a longer search time or failure to reach a near-optimal solution.

Another technical advantage achieved with the invention is that the use of real number coding avoids "Hamming Cliffs" problems normally associated with the binary coding commonly used in the traditional neural-genetic design means. Flexibility is also derived from the real number coding for its multi-modal coding capability to handle integer, symbolic and real value representations. Therefore in this genetic evolution, the NN's architecture and connectivity are optimized in terms of values, types, and existence.

In addition, a technical advantage of the invention is that the suitability of each input variable to the NN is also optimized in the genetic evolution.

DETAILED DESCRIPTION

As is commonly known, a neural network ("NN") is capable of performing non-linear mapping of data onto various conditions. NNs are capable of recognizing spatial and temporal traffic patterns by which they offer an advantage over conventional incident detection algorithms without the requirement of a mathematical model of the traffic patterns. See, e.g., R. L. Cheu, "Neural Network Models for Automated Detection of Lane-Blocking Incidents on Freeways," Dissertation, University of California, Irvine, 1994, and R. L. Cheu and S. G. Ritchie, "Automated Detection of Lane-Blocking Freeway Incidents Using Artificial Neural Networks," Transp. Res. -C, 1996, both of which are hereby incorporated by reference in their entireties.

Figure 1:
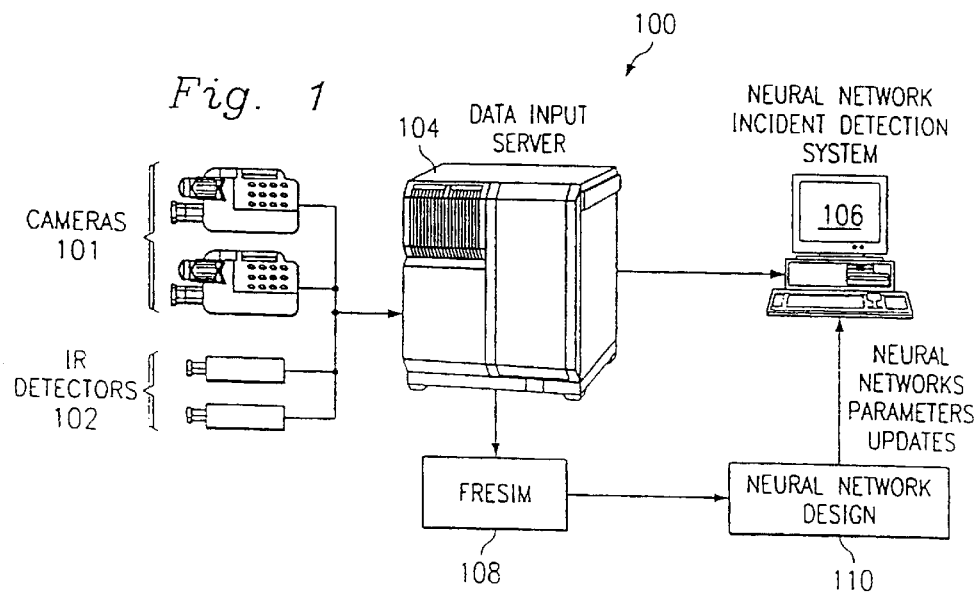
FIG. 1 is a system block diagram of an automated traffic incident detection system embodying features of the present invention.

FIG. 1 shows a system block diagram of an automated traffic incident detection system 100, that employs a neural network and neural network design techniques in accordance with the present invention.

As shown in FIG. 1, a traffic incident detection system 100 acquires current traffic data via detection cameras 101 and/or infrared detectors 102. In most cases, loop detectors will be used, due to the low installation costs thereof Such traffic data may include, for example, volume, occupancy, and speed. The traffic data acquired by the cameras 101 and detectors 102 is collected by a data server 104 or its equivalent and is stored in a database thereof in real-time. The data server 104 will subsequently provide the formatted traffic data to an incident detection system 106 comprising one or more deployed NNs. The respective NNs will subsequently evaluate the current collected traffic data to decode the incident status for that time instance. In the meantime, historical traffic data will be formulated in the data server 104 and fed into a freeway simulation model commonly known as "FRESIM" 108, which comprises a calibration system to acquire a more accurate model of the current traffic conditions. Optionally, the FRESIM system 108 uses the historical traffic data input thereto to generate simulated traffic data with predefined incident occurrences. This simulated data generated by FRESIM 108 is then formatted for input to a NN design system 110 with incorporated genetic algorithms.

It is understood that the components of the system 100, namely the server 104, the FRESIM 108, the NN design system 110, and the NN incident detection system 106, may be implemented using commercially available hardware components in conjunction with computer programming for implementation of the functionality. The hardware components include processors, memory storage including computer-readable media, input/output devices (including peripherals such as displays or printers) and other elements as will be well understood by those skilled in the art. Furthermore, the components may likewise be alternatively configured to operate as one or more different machines or as a single machine, as appropriate. Programming aspects of the system 100 may be organized and implemented in a variety of different ways, using well known programming languages, and may reside in a variety of different locations within the spirit and scope of the invention.

As will be described in greater detail below in connection with the NN design system 110, the back-propagation design technique and genetic algorithm processes performed by the system work in a cooperative manner to update a new NN to suit the incident detection in subsequent traffic conditions. Typically, a skewed timing will be used for the design of a new NN in the adaptation of new traffic conditions.

In the application of a NN to the traffic incident detection system 100, a clustering approach is adopted, in which an alarm is activated if traffic indices fall within an incident-occurrence cluster. Typically, two clusters are used; namely, incident and incident-free. The traffic indices chosen may include the following factors in upstream and downstream: volume, occupancy, and speed. Past traffic information is also considered in the design.

Figure 2:
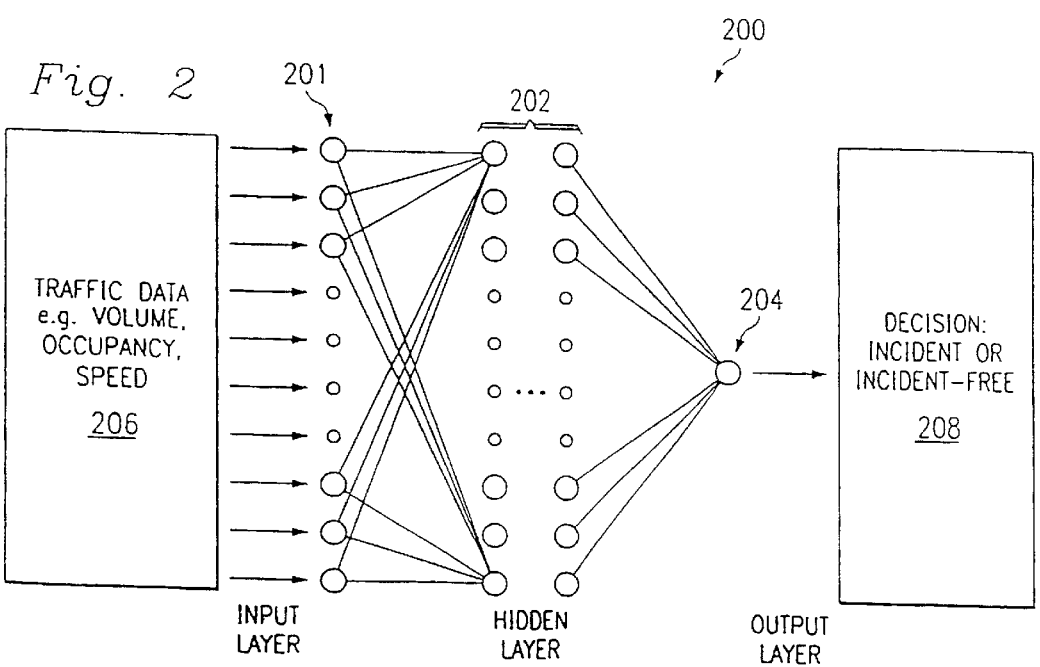
FIG. 2 illustrates the structure of a NN of the system of FIG. 1.

A typical structure of a NN of the traffic incident detection system 100 is shown in FIG. 2 and designated by a reference numeral 200. As is shown in FIG. 2, the NN 200 includes an input layer 201, one or more hidden layers 202, and an output layer 204. As will be apparent to those skilled in the art, each of the layers 201, 202, 204 comprises one or more neurons. Traffic data 206, such as volume, occupancy, and speed, is input to the NN 200 via the input layer 201 and a decision 208, i.e., "incident" or "incident-free", is output from the NN at the output layer 204.

As will be recognized by those skilled in the art, typically, the input layer 201 has one neuron for each provided input variable. The neurons in the input layer 201 usually perform no function other than buffering the input variable values. Each hidden layer 202 processes information from the input layer or a preceding hidden layer and provides the results to the next layer. During operation, each neuron of the NN 200 sums the signals provided at its input, multiplies that summation signal by a set of weights, which are selected or determined during training of the NN, and provides a weighted summation signal to each of the neurons in the next layer. These addition and multiplication steps are performed simultaneously for the neurons in each layer, beginning with the input layer 201 and proceeding in a feed-forward manner through the hidden layer(s) 202 to the output layer 204 to produce an output value of the NN. For a well-trained NN, the output value comprises a predicted value of the output variable of a process based on the provided input variable values.

One training method for a NN is the back-propagation algorithm. In view of the fact that the operation of the back-propagation algorithm is well known to those skilled in the art, the details thereof will not be discussed except as necessary to impart an understanding of the present invention. The back-propagation algorithm allows the weights connected to the output layer 204 to be adjusted from the output error signals. The errors are back-propagated and the weights back-adjusted layer by layer, in reverse order, from the output layer 204 to the input layer 201. This process is repeated for one "epoch", that is, until all of the training data has been used. A complete training process typically requires many epochs in order to gain optimal connection strength and the associated threshold. Batch and incremental learning schemes are commonly used in such back-propagation training. The advantage of using a batch learning scheme is the ability to achieve high modeling accuracy in exchange for a lower leaning speed, whereas the incremental learning scheme can provide a better learning speed with a higher modeling inaccuracy. The learning momentum and learning rate are also incorporated in the back-propagation training for learning efficiency. However, there are several drawbacks to using back-propagation as a training method for NN design, including the facts that:

(a) gradient guidance is embedded in the back-propagation training and it passively adjusts parameters from errors only; thus, it may not allow modified error terms that reflect real engineering requirements;
  (b) the trained network parameters may be local optima that may not lead to global convergence in the multimodal design space;
  (c) the architecture of the network, as well as the use of a single type of activation function (typically a sigmoid function), if mathematically-guided optimization is used, must be fixed prior to parameter training; and
  (d) it is difficult to incorporate knowledge and expertise that the designer may have on the NN.

The construction of an optimal NN is problematic, as each architecture of the NN varies with different types of data and applications. Simply put, it is very difficult for a human programmer to comprehend a complex NN. Therefore, organizing the structure of an NN is often accomplished by trial-and-error, using an intuitive understanding of the knowledge being represented. In many engineering applications, it usually takes an expert to train an NN of fixed architecture in a heuristic process, let alone optimizing the architecture at the same time. To be specific in the design of an NN, using back-propagation of incident detection, several uncertainties are encountered in the design process, including:

(a) the number of hidden layers to be used in the NN;
  (b) the number of neurons to be used in each hidden layer;
  (c) the existence of each particular neuron in each hidden layer;
  (d) the choice of the type of activation function to be used in each neuron of the NN;
  (e) the weight and existence of each connection between neurons inclusive of bias nodes;
  (f) the suitability of each input variable to the network; and
  (g) the globability of the design search.

Recent developments in evolutionary computing, as described in A. Häeussler, et al., "Neurocontrollers Designed by a Genetic Algorithm", First IEE/IEEE Int'l Conference on GA in Eng. Sys.: Innovations and Applications, pp. 536–542 (1995), and Y. Li et al., "Automation of Linear and Non-linear Control Systems Design by Evolutionary Computation", IFAC Youth Automation Conference, Beijing, China (1995), and Y. Li et al., "Macroeconomics Modeling on UK GDP Growth by Neural Computing", Preprints of IFAC/IFIP/IFORS/SEDC Symposium Modeling and Control of National and Regional Economics, Australia (1995), all of which are hereby incorporated by reference in their entireties, describe genetic algorithm techniques which can be applied to resolving the drawbacks and uncertainties listed above. As described in detail below, the system 100 utilizes a systematic and reusable evolutionary computing paradigm for solving such complex design problems, with a focus on the design automation by a genetic algorithm.

The training data for the NN design is described in detail below, first with respect to input data and then with respect to output data

INPUT DATA

Off-line training and testing data sets are first generated from a calibrated microscopic freeway traffic simulation model called FRESIM, formally known as INTRAS ("INtegrated TRAffic Simulation"), which is described in D. A. Wicks and E. B. Lieberman, "Development and Testing of INTRAS, A Microscopic Freeway Simulation Model", Volume 1, Program Design, Parameter Calibration and Freeway Dynamics Component Development, Report No. FHWA/RD-80/106, Federal Highway Administration, 1980 (hereinafter "INTRAS Report"), which is hereby incorporated by reference in its entirety. Both data sets will consist of a few hundred data blocks of traffic measurements. Specifically, both data sets will be formatted with rows of data set instances. These data set instances are mainly traffic volume (vehicles/hour/lane) at time instances t, t-1, t-2, t-3, and t-4, collected at an upstream traffic measurement stations, occupancy (%) at time instances t, t-1, t-2, t-3, and t-4 collected at an upstream traffic measurement station, traffic volume (vehicle/hour/lane) at time instances t, t-1, and t-2, collected at a downstream traffic measurement station, and occupancy (%) at time instances t, t-1, and t-2, collected at a downstream traffic measurement station. As demonstrated above, historical traffic data is considered. In some cases, difference functions of occupancy, speed and volume are also considered, for example: $occ\_dif(t)=occ(t)-occ(t-1)$ or $occ\_UpDn\_dif=occ_{up}(t)-occ_{dn}(t)$.

A few hundred incident cases are simulated and generated for each data set. Each incident data block will last for a reasonable time duration that had what would be considered normal traffic conditions before and after the incident occurred. The occurrence of the incident will consider situations of 1 lane and 2 lanes blocked midway between upstream and downstream traffic measurement stations. Data instances collected at both upstream and downstream traffic measurement stations will consider incidents that occurred at Locations before and after the upstream and downstream traffic measurement stations, respectively. In these cases, incident-free status will be assigned to the data instances collected. As for the incident occurrence, lane blocking will be considered at extreme left, middle, and extreme right lane of a freeway.

Figure 3:
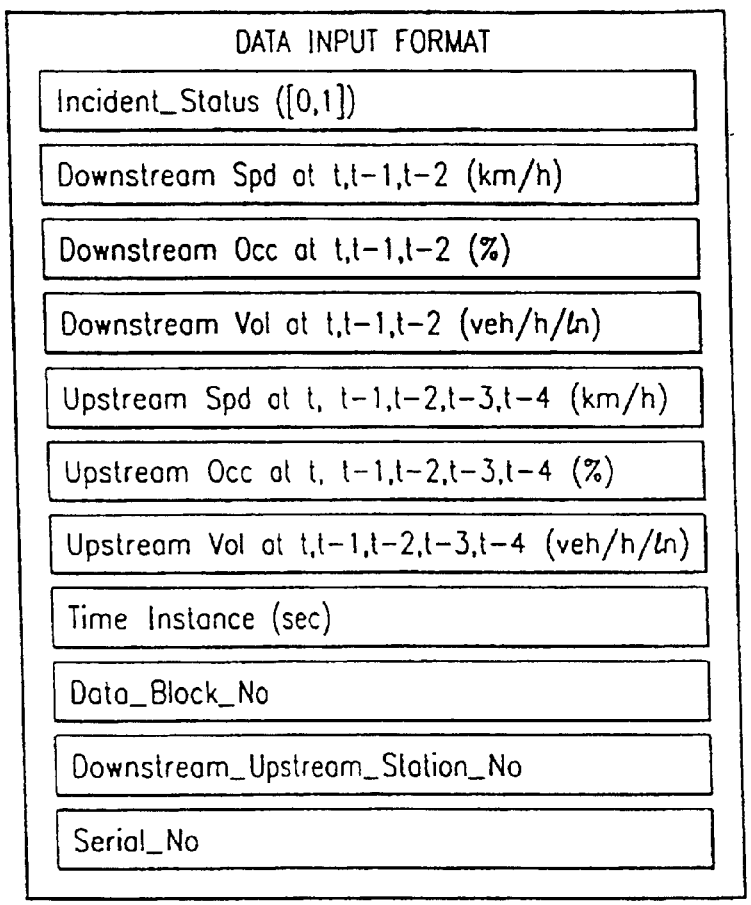
FIG. 3 illustrates the format of the input and output data of the system of FIG. 1.

FIG. 3 illustrates the input and output data format 300 incorporated with serial numbers, downstream and upstream traffic measurement station numbers, data block numbers, time-stamps, traffic data instances, and incident status for easy data retrieval and originality.

At each time instance of 30 or 60 seconds, a row of data set is composed from the upstream and downstream traffic measurement station in which the average traffic volume, occupancy, and speed will be fed into the NN for design. During the training phase of the design of the NN using a genetic algorithm, a total of a few thousand rows of data set will be used. A new data set of similar size will also be used for verification or testing of the incident detection performance; however, the size of training and testing data is subjective and depends on the comprehensiveness and accuracy of the network design required.

In the on-line design, the microscopic freeway traffic simulation model, FRESIM, can be automatically calibrated to generate training and testing data sets with predefined incident cases. Alternatively, manually screened real traffic data can also be collected and used in the NN design if the training targets are made available.

OUTPUT DATA

As can be seen in FIG. 3, the output data of an NN will be compared with the incident status column indicating the incident status for each traffic data instance. This column of data will be used as the target values for NN training, especially in the off-line design. Therefore, the design of a NN in this format advantageously will minimize the error between the target and network output values.

The design automation and optimization of the NN 200 using a genetic algorithm will now be described. A genetic algorithm, which is based on the survival-of-the-fittest Darwinian principle in the natural process for biological reproduction and mutation, is used to automate the NN design process. Compared with natural evolution, this emulated process is more efficient and controllable, and yet more flexible for artificial optimization. This approach has proved to be particularly effective in searching though poorly understood and irregular design space using coded chromosomes with a finite length of string representation.

In general, as will be recognized by those skilled in the art, the first step in the application of a genetic algorithm to a function is the encoding of the parameter space as a string, or "chromosome" of (typically binary) digits. Substrings in such a representation correspond to parameters of the function being optimized and each chromosome represents a "blueprint" of an NN for solving the particular problem. A particular individual string represents a point in the parameter space of the function. The genetic algorithm considers a population of such individuals. The population, in conjunction with the value of the function for each individual (generally referred to as "fitness"), represents the state of the search for the optimal string. The fitness of a particular NN is a combined measure of its worth on the problem, which may take into account learning speed, accuracy, and cost factors such as the size and capacity of the NN.

The genetic algorithm progresses by implicitly encoding information about the function in the statistics of the population and using that information to create new individuals. The population is cyclically renewed according to a reproductive plan. Each new "generation" of the population is created by first sampling the previous generation according to fitness; the method used for differential selection is known to be a near-optimal method of sampling the search space. Novel strings are created by altering selected individuals with genetic operators. Prominent among these is the crossover operator that synthesizes new strings by splicing together segments of two sampled individuals.

A genetic algorithm that yields satisfactory results in many practical problems consists of three main operations, which are reproduction, crossover, and mutation, in the following process:

$t \leftarrow 0$

Make initial population.

REPEAT $t \leftarrow t+1$

Choose parents from the population;

Selected parents produce children weighted by their individual fitness (via crossover and mutation);

Extend the population with the children;

Select the fittest individuals of the extended population to survive for the next cycle;

UNTIL satisfactory generation found

Output the optimum of the population (final solution)

The crossover operation exchanges portions of internal representation between the parent pair and mutation changes the value of a gene. Starting from the initial population, the genetic algorithm evaluates the fitness of each feasible solution in the evolution from one generation to another until stopping criteria are met. Each feasible solution is coded as a chromosome with string representations. Genetic algorithms have been used to tackle different kinds of problems in NN research. One typical problem is determining the connect weights in which overcome the local optimum while maintaining the NN topology. Another application of the genetic algorithm is to search the architecture of the NN. The particular genetic algorithm used in connection with the present invention will optimize both the connect weights and architecture of the NN, as well as establish the existence of connections and bias nodes, suitability of input data, and choice of activation functions. Therefore, the proposed genetic algorithm will use coded chromosomes of real numbers (genes) in the search process. A rank based selection scheme, multiple crossover points, adaptive mutation schemes, and generation gap hypothesis are also adopted in the genetic algorithm. For example, a reduced rule-based and direct implementation of fuzzy logic control system as described in K. C. Ng, "Switching Control Systems And Their Design Automation Via Genetic Algorithms", Ph.D. Thesis, University of Glasgow, UK, 1995, is incorporated by reference in its entirety and illustrates desired schemes and hypotheses.

Figure 4:
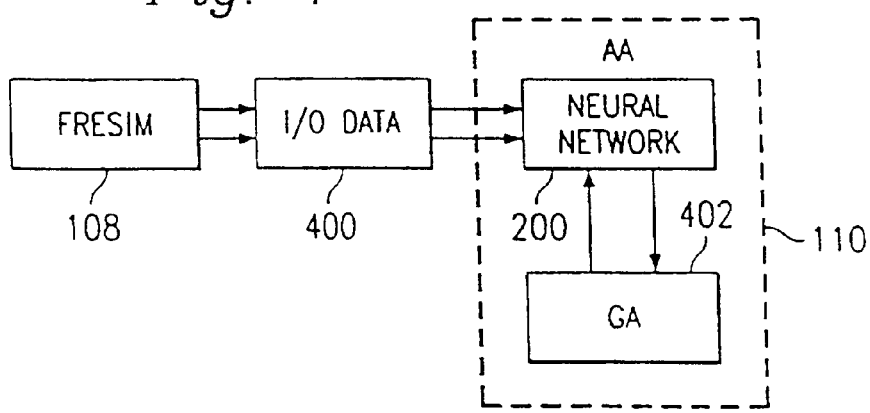
FIG. 4 is a schematic block diagram of the design of a NN for use in the system of FIG. 1 using a genetic algorithm.

The schematic diagram for the design of an NN using a genetic algorithm for the traffic incident detection system 100 (FIG. 1) is shown in FIG. 4. Referring to FIG. 4, and as shown in FIG. 1, the FRESIM system 108 generates simulated I/O data 400 to the NN design system 110, comprising at least one NN, such as the NN 200 (FIG. 2), and a genetic algorithm 402 for tog the NN.

The NN 200 is trained by a back-propagation algorithm incorporated with a hybrid combination of both batch and incremental learning schemes, whereas the genetic algorithm is used to optimize the design. The learning scheme adopted here is to achieve both high learning speed and good modeling accuracy.

An Appendix, attached hereto, contains programming code representations that, for illustrative purposes only, may be used in implementing the design optimization techniques of the present invention as described more fully below in connection with FIGS. 5 and 6. Those skilled in the art will recognize that alternative code representations are possible within the intended scope of this disclosure.

Figure 5:
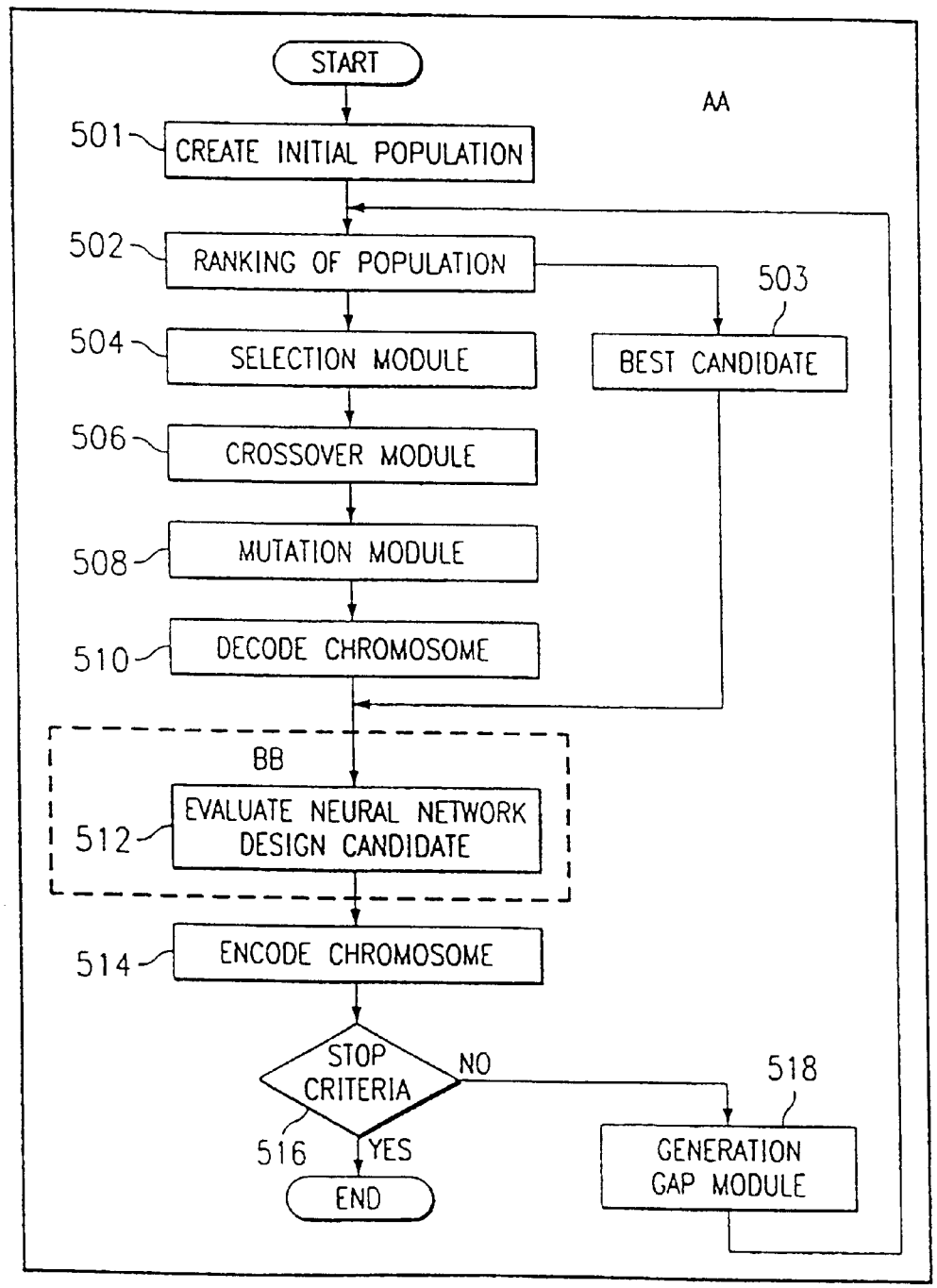
FIG. 5 is a flowchart of a method of optimizing the NN of FIG. 4 using a genetic algorithm in accordance with the present invention.

FIG. 5 illustrates a flowchart 500 for optimizing the NN design using a genetic algorithm. In step 501, an initial population of randomly generated chromosomes (real number representation for NN design parameters) is created. For example, one chromosome of the population might be formatted and appear as follows:

Real number coding:

| 0.23234 | 0.54321 | 0.10354 | 1.23244 | -1.355 | -0.64221 | 0.01134 | ... → |

→ ........................................................................................ →

| →......... | 0.54321 | 0.10354 | 1.23244 | -1.355 | 0.18265 | -0.9545 | 10.343 |

Note that each design parameter is represented by only one gene with no resolution limitation.

However, there are other coding means available such as unsigned integer coding as described in K. C. Ng, "Switching Control Systems And Their Design Automation Via Genetic Algorithms", Ph.D. Thesis, University of Glasgow, UK, 1995, which is hereby incorporated by reference in its entirety, and the traditional binary coding. Examples for the two coding means whose representations are given as follows:

Unsigned Integer number coding (Base $n$):

| 8 | 0 | 7 | 3 | 1 | 4 | 9 | ... → |

→ ........................................................................................ →

| →......... | 3 | 4 | 2 | 5 | 1 | 5 | 6 |

Note that the given example is using the base-10 coding. Each design parameter is usually represented by one or more genes to meet the resolution requirement.

Binary number coding:

| 0 | 0 | 1 | 1 | 1 | 0 | 0 | ... → |

→ ........................................................................................ –

| →......... | 1 | 1 | 1 | 1 | 0 | 0 | 0 |

Note that each design parameter is usually represented by many genes to meet the resolution requirement.

As can be seen in the above examples, the binary coding can easily increase the length of the chromosome as each coded parameter can be represented by a group of genes using either 1 or 0 when compared to the unsigned integer coding and real number coding. In addition, "hamming cliffs" and resolution problems can easily be encountered in binary and unsigned integer coding. To avoid extended chromosome length, "hamming cliffs" and resolution problems, the real number coding technique is adopted in our application with the additional advantages of accepting symbolic, integer and real number representations in the chromosome. The design parameters, especially for the neural network design, will include (a) the number of hidden layers to be used in the NN; (b) the number of neurons to be used in each hidden layer; (c) the existence of each particular neuron in each hidden layer; (d) the choice of the type of activation function to be used in each neuron of the NN; (e) the weight and existence of each connection between neurons inclusive of bias nodes; and (f) the suitability of each input variable to the network. The detailed representations of the chromosome with real number coding will be given and discussed later.

In step 502, the inhabitants of the population created in step 501 are ranked according to their fitness measured by the function in (1) or (7). The ranked inhabitants produce a best candidate in step 503 (see appendix), that is input into the evaluation process BB (FIG. 6) in step 512, in which it will undergo one epoch of the back-propagation training operation to explore its local search alone.

In step 504, a selection module is executed to find a group of parent pairs of chromosomes for breeding. In this breeding, the first parents are selected from the top 25% of the population based on their fitness. The second parents are randomly selected from the top 50% and bottom 50% of the population arranged by their fitness. If the first and second parent pair are identical, re-selection of the second parent will be activated. In this breeding method, the first parent will be used twice to pair-off for the crossover operation. In step 506, a crossover module is executed with each parent pair to exchange portions of their genetic material. Portions of genetic material are referred to several small group of genes which will be exchanged at several crossover points, say 5, with a pre-defined segment length in the chromosome. The position of a crossover point within the pre-defined segment is randomly selected with a probability, say 0.8. After this operation, two new chromosomes are generated which will be different from their parent pair. In step 508, a mutation module is executed to modify the value of genes in the two new chromosomes generated in step 506. The genes are randomly selected with a probability, say 0.05, to undergo mutation by means of randomly increase or decrease in the values of gene. In step 510, the resultant chromosome is decoded into the neural network's design parameters to construct the network for later evaluation of the network's performance. This chromosome is referred as the neural network design candidate. The details of decoding are described later. In step 512, the neural network design candidate is evaluated by the global measure of fitness as described in equation (1) or (7). It is carried out in the following manner. During the evaluation, a set of neural network training data is fed into the network and the output of the network is compared to the targeted outputs. During this process, the back-propagation training is also in place to determine the amount of the weight increment and its adjustments of the connection weightage using both batch and incremental weight update. After such local training using back-propagation, the network is re-evaluated with the training data set for performance measure. The accumulated design error information, as in equation (2), (3), (4), (5) and (6), between the outputs of the network and the targeted outputs will be derived for equation (1) or (7). After the evaluation, each neural network design candidate or chromosome is assigned with its respective fitness value.

In step 514, the chromosome is encoded with modified neural network design parameters after the back-propagation training, since the weightage of the connections had changed during the training. The encoding is done by re-writing the network design parameters' values into respective genes in the chromosome. That includes the weights of connections, the number of hidden-layers, the number of neurons per hidden-layer, the type of activation functions used and the suitability of input data, and the like. The details of encoding are described on later.

In step 516, a determination is made whether a stop criterion has been met. For example, the specified number of generations has been reached or the best recorded fitness value has no improvement for more than the specified number of generations, say 20 generations. If so, execution terminates; otherwise, execution proceeds to step 518, in which a generation gap module 518 is executed.

The generation gap module 518 is to allow good genetic material to be passed on to the next generation, leading to reservation of potentially better solutions and thus improving the convergence rate of the genetic algorithm. The scheme proceeds by: (a) replacing the worst chromosome in the new generation with the best chromosome in the old generation if there is an improvement in fitness from the new generation compared to the globally recorded best fitness; and (b) replacing a group of chromosomes in the new generation with an equal-sized group from the old generation according to their rank in fitness when there is no improvement made, and then returns to step 502.

The "best candidate" is the globally recorded highest fitness chromosome. Its fitness value is used to determine the decision of the generation gap operation of whether to replace one chromosome or a group of chromosomes in the new generation with those in the old generation.

Figure 6:
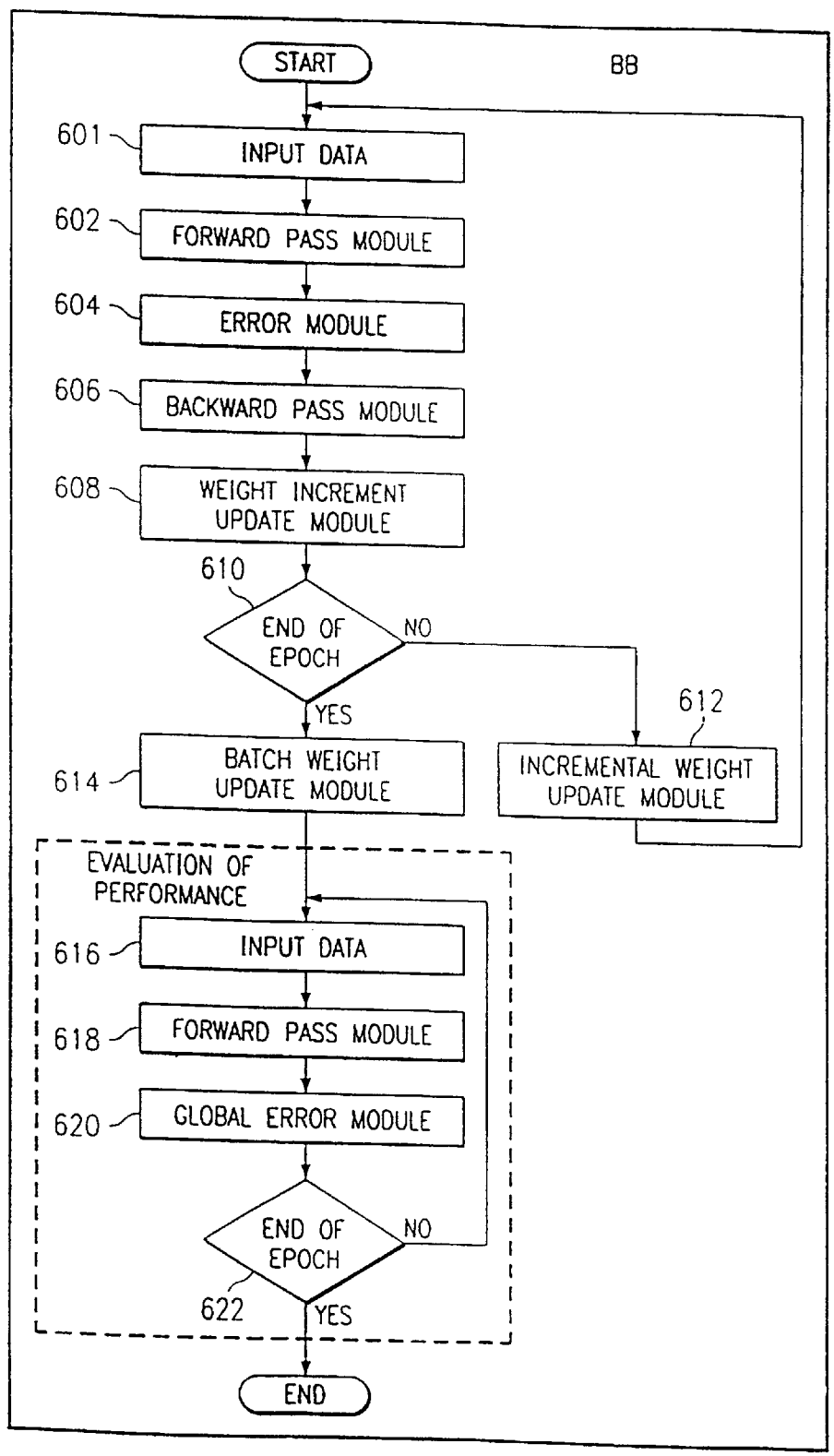
FIG. 6 is a flowchart of the optimizing the NN of FIG. 4 using back-propagation in accordance with the present invention.

FIG. 6 is a flowchart 600 for the design of a NN using back-propagation in one epoch. In step 601, input data generated by FRESIM is provided. FRESIM is commercially available supplied by the McTrans Centre, University of Florida, 512 Weil Hall, PO Box 116585, Gainesville, Fla. 32611-6585. The output data of the FRESIM is in text form stored in a file whose format is described below. Referring also to FIG. 4, the I/O data module 400 includes "middle software" to extract the FRESIM's output data and tabulate the data n the format as shown in FIG. 3:

| | | | | | | | | | |
|---|---|---|---|---|---|---|---|---|---|
| | | | | | POINT PROCESSING OUTPUT | | | | |
| | | | | | EVALUATION PERIOD BEGINNING TIME = 1 (SECONDS) | | | | |
| | | | | | EVALUATION PERIOD ENDING TIME = 30 (SECONDS) | | | | |
| LINK | LANE ID NO. | DISTANCE FROM UPST. NODE (FT) | LOOP LENGTH (FT) | STATION NO. | DETECTOR TYPE | MEAN VOLUME (VPH) | MEAN SPEED (MPH) | MEAN HEADWAY (SEC) | OCCU- PANCY RATE |
| (13, 14) | 1 | 237.00 | 6.0 | 1 | COUPLED PAIR OF SHORT LOOPS | 1440 | 30.033 | 2.447 | 23.514 |
| (13, 14) | 2 | 237.00 | 6.0 | 1 | COUPLED PAIR OF SHORT LOOPS | 2160 | 28.629 | 1.599 | 23.268 |
| (13, 14) | 3 | 237.00 | 6.0 | 1 | COUPLED PAIR OF SHORT LOOPS | 1680 | 29.128 | 2.128 | 17.270 |
| (22, 23) | 1 | 296.00 | 6.0 | 2 | COUPLED PAIR OF SHORT LOOPS | 600 | 40.968 | 5.019 | 4.822 |
| (22, 23) | 2 | 296.00 | 6.0 | 2 | COUPLED PAIR OF SHORT LOOPS | 1920 | 34.069 | 1.707 | 28.624 |
| (22, 23) | 3 | 296.00 | 6.0 | 2 | COUPLED PAIR OF SHORT LOOPS | 2280 | 37.830 | 1.536 | 19.384 |
| (22, 23) | 4 | 296.00 | 6.0 | 2 | COUPLED PAIR OF SHORT LOOPS | 1800 | 39.997 | 1.881 | 13.530 |
| (31, 40) | 1 | 365.00 | 6.0 | 3 | COUPLED PAIR OF SHORT LOOPS | 2160 | 32.192 | 1.470 | 30.970 |
| (31, 40) | 2 | 365.00 | 6.0 | 3 | COUPLED PAIR OF SHORT LOOPS | 2520 | 30.791 | 1.345 | 30.632 |
| (31, 40) | 3 | 365.00 | 6.0 | 3 | COUPLED PAIR OF SHORT LOOPS | 2520 | 29.221 | 1.330 | 25.887 |
| (44, 45) | 1 | 1593.00 | 6.0 | 4 | COUPLED PAIR OF SHORT LOOPS | 1320 | 45.647 | 2.629 | 14.601 |
| (44, 45) | 2 | 1593.00 | 6.0 | 4 | COUPLED PAIR OF SHORT LOOPS | 1560 | 48.617 | 2.278 | 12.721 |
| (44, 45) | 3 | 1593.00 | 6.0 | 4 | COUPLED PAIR OF SHORT LOOPS | 2640 | 49.929 | 1.349 | 17.537 |
| (44, 45) | 4 | 1593.00 | 6.0 | 4 | COUPLED PAIR OF SHORT LOOPS | 2400 | 47.565 | 1.492 | 15.476 |

In 602, 604, 606, and 608, respectively, a forward pass module, an error module, a backward pass module, and a weight increment update module are executed. The Forward Pass module allows each neuron of the network to sum the signals provided at its input, multiplies that summation signal by a set of associated weights and then provides a weighted summation signal to each of the neurons in the next layer. The propagation of signal is proceeded with a feed forward manner through hidden-layers to the output layer to produce an output value of the network. In this forward pass module, as recited in each of the neurons, an activating function will be selected to generate an output to be propagated to the next layer. The Error Module is to perform an error computation at the output layer when compared to a targeted value. The computed errors will be back-propagated to the preceding layers till the first hidden-layer. The Backward Pass module performs a similar task as Forward Pass Module but in a reverse mode in which a summation error signal is back-propagated to each of the hidden-layers. The Weight Increment Update module performs a computation at each neuron to determine the amount of changes required at its input weighted connection. In step 610, a determination is made whether the end of the epoch has been reached.

As in the training mode, the epoch is a user pre-defined number defining the size of training data and it is used in decision making of when to execute the batch Weight Update module 614 or Incremental Weight Update module 612. If not, execution proceeds to step 612, the incremental weight update module 612 is re-executed and execution returns to step 600. If in 610, the end of the epoch has been reached, execution proceeds to step 614, in which a batch weight update module is executed.

The Batch Weight Update module 614 is to exert the amount of changes required for every connection weights and it is carried out at the end of the epoch. The Incremental Weight Update module 612 changes the connection weights immediately when the weight increment update had computed the amount of changes made by each error generated by each data input. In step 616, input data similar to data used for training is input to the network again to evaluate the actual network performance after the modification done by the batch weight update and incremental weight update modules. In steps 618 and 620, respectively, a forward pass module and a global error module are executed.

The Forward Pass and Global Error modules 618, 620 are used to perform an actual implementation task to compute for the network performance with the new connection weights. In step 622, a determination is made whether the end of the epoch has been reached. If not, execution returns to step 616; otherwise, execution terminates.

Generally in the design of a neural network using a genetic algorithm, the process consists of genetic algorithm preparation design steps as follows: 1) select the appropriate type of chromosome coding scheme; 2) define the parameters to be coded in the chromosome; 3) formulate an appropriate input/output data format or evaluation model for optimization purposes; 4) select an appropriate objective function or fitness function; 5) define the appropriate genetic algorithm control parameters such as mutation rate, crossover rate, number of crossover points, number of population size, stopping criteria; 6) select the appropriate selection, mutation and crossover schemes as well as the generation gap hypothesis; 7) apply the appropriate searching/optimizing approach; and 8) adopt an appropriate initialization of the initial population such as, for example, using an existing design candidate or chromosome.

As in the preparation phase, a global measure of fitness, which is similar to the inverse of a cost-function in optimization, is adopted. It is user-defined and provides the interface between the designer and the searching algorithm for an effective and optimal design. In the process of evolution for a coded design problem, a population of chromosomes are updated according to the relative individual fitness that reflects the evaluated performance index. Usually those design candidates that are being assigned with a higher value of fitness will have a higher probability of contributing one or more offspring ("children") in the next generation.

Hence, a simple fitness function that reflects a low false-alarm rate ("FAR1") in terms of false alarms measured with respect to total incident cases, a low false-alarm rate ("FAR2") in terms of false alarms measured with respect to total incident-free intervals, a high detection rate ("DR"), a good modeling accuracy ("MA") in terms of total absolute errors measured with respect to total maximum absolute errors, and a high correct output-state performance ("CSP") aggregated for all time intervals measured with respect to total given states, is given by:

$$f(Pi)=a*FAR1+b*FAR2+c*DR+d*MA+e*CSP \qquad (1)$$

Here, constants a, b, c, d, and e are used to scale each individual factor, such as FAR, DR, MA and CSP, in terms of priority or emphasis. The typical values for a, b, c, d, and e are 1.0, respectively. Equations for FAR1, FAR2, DR, MA and CSP are as follows:

$$FAR1=1-(\Sigma False\_Alarm\_cases/\Theta Actual\_Incident\_cases) \qquad (2)$$

$$FAR2=1-(\Sigma False\_Alarm\_intervals/\Sigma Actual\_Incident\_Free\_intervals) \qquad (3)$$

$$DR=\Sigma Detected\_incidents\_cases/\Sigma actual\_Incident\_cases \qquad (4)$$

$$MA=1-\Sigma|err|/\Sigma|err_{max}| \qquad (5)$$

$$CSP=\Sigma Correct\_Output\_State/\Sigma Given\_Output\_State \qquad (6)$$

Similarly, equation (1) can be redefined as follows to serve the same purpose without the scaling constants a, b, c, d, and e:

$$f(Pi)=a*FAR1*FAR2*DR+b*MA*CSP \qquad (7)$$

The coding of a chromosome will now be described in detail. A concatenated real number coding of chromosomes is used in the genetic algorithm for ease of application and manipulation. The coded parameters will, therefore, include as follows:

(a) the number of hidden layers to be used in the NN (b) the number of neurons to be used in each hidden layer;

(c) the weight of connections to neurons, inclusive of biased links;

(d) the choice of existence of input variables or input nodes;

(e) the existence of each particular neuron in each hidden layer;

(f) the choice between three types of activation functions to be used in each neuron of the NN; and (g) the choice of the existence of each connection between neurons, inclusive of biased links.

The choice of chromosome length will consider a full network configuration with parameters to be optimized. For example, assuming that the maximum number of hidden layers is two and the number of neurons in each hidden layer is 30, in most cases, a maximum number of two hidden layers will be just sufficient for many applications. To minimize the length of the chromosome, each gene of the chromosome will be used to define each network parameter, such as weight of a link, existence of a link, choice of an activation function, number of nodes in each hidden layer, etc.

Therefore, a formulated chromosome whose genes used in the incident detection system design will require an encoding and a decoding function as illustrated below:

DECODE:

| Float | Float | Float | Float | Float | Float | Float |
|-------|-------|-------|-------|-------|-------|-------|
| G1    | G2    | G3    | G4    | G5    | G6    | G7    |

G1—used to define the number of hidden layers. Normalization of real values to an integer value of either 1 or 2 is adopted. The upper limit is user-defined. An example of a C coding is as follows:

hiddenlayer=1+((int)fabs(chrom[p]*100.0))%MAX_H_LAYER;/*decoding*/chrom[p]=(hiddenlayer−1)*0.01; /*encoding*/

Note MAX_H_LAYER=2 and p is an incremental counter of the genes' location.

Encoding of the chromosome's gene is also implemented here for preventing the real value of the gene from exploding.

G2—used to define the number of neurons in each hidden layer. Normalization of real values to an integer value from 1 to 30 is adopted. The upper limit is user-defined. An example of a C coding is given as follows:

for(i=1;i<=MAX_H_LAYER;i++){
    neuron_in_layer[i]=1+((int)fabs(chrom[p]* 1000.0)) %MAXNEURON;
    /*decoding*/
  }
    chrom[p]=(neuron_in_layer[i]−1)*0.001; /*encoding*/

Note MAXNEURON=30 and p is an incremental counter of the genes' location. Encoding of the chromosome's gene is also implemented here for preventing the real value of a gene from exploding.

G3—used to define the weight of each connection from input-layer to output-layer inclusive of bias links. Range=− $3.4 \times 10^{+38}$ to $3.4 \times 10^{+38}$.

G4—used to define the choice of input variables to be used in the NN. Normalization of real values to an integer value of either 1 or 0 is adopted. An example of a C coding is as follows:

for(I=1;i<=Input_Size;i++){
    neuron_in_layer[i]=((int)fabs(chrom[p]*100.0))%2;
    /*decoding*/
    chrom[p]=neuron_in_layer[i]*0.01; /*encoding*/
  }

Note Input_Size=24 and p is an incremental counter of a gene's location. Encoding of the chromosome's gene is also implemented here to prevent the real value of a gene from exploding.

GS—used to define the existence of each particular neuron in each hidden layer. Normalization of real values to an integer value of either 1 or 0 is adapted. The example of C coding is given for G4, above.

G6—used to define the choice among sigmoid, gaussian, and hyperbolic-tangent activation function used in each neuron. Normalization of real values to an integer value of either 0,1, or 2 is adapted. The example of C coding is given for G4 above, with a modulus operation whose value is set to 3. The activation functions used are given as follows:

$$y = \frac{1}{1+e^{-\sum w_{ij} x_j - \theta_j}}$$

where x denotes the inputs to a node, y denotes the output of a node θ denotes the bias value, and w denotes the weight of a link between the preceding node i and the current node j.

$$y = \frac{1-e^{-2\sum w_{ij} x_j - \theta_j}}{1+e^{-2\sum w_{ij} x_j - \theta_j}}$$

where x, y, θ, and 2 are as defined for equation (8).

$$y = e^{\frac{|\sum w_{ij} x_j - \theta_j|^\beta}{\sigma}}$$

where α, β, θ, and w are as defined for equation (8), and α and β denote the scaling values that define the base-length and shape of the gaussian function, respectively. The decoding of α and β values are also done in this group G6 with respect to the nodes' locations.

G7—used to define the choice of existence of each connection from input-layer to output-layer inclusive of biased links. Normalization of real values to an integer value of either 1 or 0 is adopted. The example of C coding is given for G4 above.

Note that the integer values of 1 and 0 represent the existence and absence of the network parameters, respectively. Note also that the sequence of decoding the chromosome to form the network with steps as follows:

(I) determine the number of hidden layers from the chromosome;
  (ii) with (i), determine the number of neurons used in each hidden layer;
  (iii) with (i) and (ii), determine the existence of each particular neuron in each hidden layer;
  (iv) with (i) and (ii), determine the choice between sigmoid, gaussian, and hyperbolic_tangent activation function used in each neuron;
  (v) with (i) and (ii), determine the choice of existence of each connection from input-layer to output-layer inclusive of biased links;
  (vi) with (i) and (ii), determine the weights of each connection from input-layer to output;layer, and
  (vii) determine the choice of input variables to be used in the NN.

ENCODE:

| Float | Float | Float | Float | Float | Float | Float |
|-------|-------|-------|-------|-------|-------|-------|
| G1    | G2    | G3    | G4    | G5    | G6    | G7    |

Group G3 (weight of connections) will be encoded back to the associated chromosome after the values are modified by the back-propagation training algorithm. The res t of the parameter groups will also be encoded back, but modified to their respective actual representation values scaled from their respective factor of 100 or 1000, as given in the decoding function.

Evolution will now be described. During the evolution, two optimization on processes are operating simultaneously; namely, the genetic reproduction process with back-propagation training and the standalone back-propagation training for the best recorded design candidate. In such automatic design approach using a genetic algorithm, it is necessary to specify the population size and fitness function as described above. A small population size for the NN incident detection design is usually selected, e.g., 4, in view of the data size and complexity of the design problem under study and also the genetic algorithm described here has the similar capabilities of a micro-genetic algorithm. The crossover rate is fixed at 0.8 and the adaptive mutation rate ranges from 0.025 to 0.25, depending on the similarity between the parents and children. The momentum and leaning rate of the NN design are also fixed at 0.7 and 0.01, respectively.

In the off-line and on-line design of an NN, the genetic algorithm can provide the ability to commence the search from the existing designs as prior knowledge. Using such prior knowledge, the system designer can first include the design in the initial population with a coded chromosome, and the rest of the initial population can be filled with randomly generated chromosomes or chromosomes mutated from the existing design. This ensures a good and direct start for the genetic algorithm search with reduced design time. The whole genetic algorithm design process is chosen, at ease of operation and automation, to be completed at a generation whereby there is no improvement for the last few generations, say 20.

Figure 7:
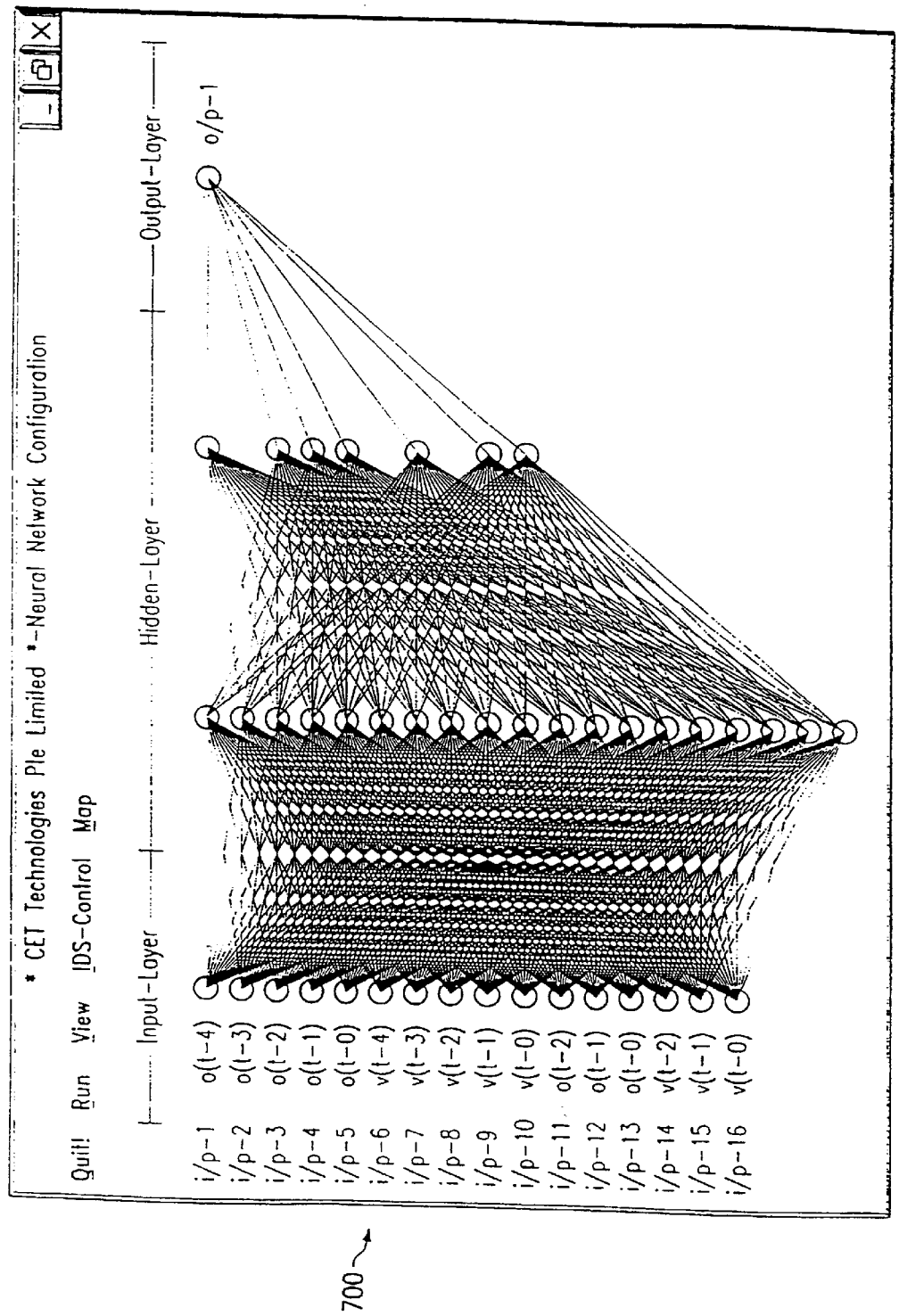
FIG. 7 illustrates the architecture of the NN of FIG. 4 optimized using the method of FIG. 5.

FIG. 7 illustrates an example of the NN architecture recommended and optimized by the genetic algorithm.

In the incident monitoring, a selected freeway usually consists of several sections partitioned by detector stations. As a result, different NNs with different architectures and parameters are required for monitoring every section of the freeway. In the traditional design of an NN with back-propagation, heuristic knowledge and past experiences are required, especially on the type of activation functions used in each hidden layer, the number of hidden layers, and the number of neurons per hidden layer. In addition, a complete-connection configuration between neurons in each layer is usually assumed from input layer to output layer. Such design approaches are ad hoc and made by trial-and-error and also time consuming, especially designing a number of different NNs for every section of the freeway being monitored.

Accordingly, the development of an automated incident detection system using an artificial, multi-layered feed-forward NN designed using genetic algorithm-based evolutionary computing techniques are disclosed. Using such "off-the-computer" computing paradigms, the genetic algorithm can automatically recommend the network configuration, weights, existence, connectivity, number of hidden layers, number of neurons per hidden layer, type of activation function, and selection of input data. Results of comparison has shown that this guided evolution leads to globally optimal networks and more accurate results. In the on-line design of NNs for adaptive applications, the genetic algorithm would commence the search process with a prior knowledge using an existing design. Subsequently, a skewed-time updating of NN parameter would be adopted for adaptation.

Referring again to FIG. 1, the incident detection system 106 implements a designed neural network by deriving neural network design parameters from the coded chromosome optimized by the genetic algorithm. Each configuration of the neural network with its associated connection weights and other design parameters are stored in the chromosome. Therefore, every neural network can be reconstructed by re-using the decoding function. In the execution of the neural network for incident detection, the traffic data at each time instance will be evaluated by, for example, using the forward pass and error computation modules 618, 620 to assert the incident status.

Each individual neural network in the incident detection system 106 is periodically updated. The neural network design parameters coded in the chromosome are stored in a binary file after being optimized by the genetic algorithm. This stored chromosome will later be transported to the incident detection system 106 for a new update of a neural network by replacing the existing chromosome for a particular neural network.

Although illustrative embodiments of the invention have been shown and described, a wide range of modification, change and substitution is intended in the present disclosure. In some instances, features of the invention may be employed without a corresponding use of other features.

What is claimed is:

1. An automatic traffic incident detection system for identifying the presence or absence of incidents of traffic congestion, comprising:

sensors for acquiring traffic data;

a data server for collecting and storing the traffic data acquired from the sensors;

an incident detection processor connected to the data server, the incident detection processor including at least one neural network for evaluating the traffic data to determine the incident status for that time instance; and a neural network design system for updating the at least one neural network used by the incident detection processor in incident determinations, the neural network design system receiving the traffic data as input and utilizing both a global search and a local search for optimizing the design of the updated neural network.

2. The automatic traffic incident detection system of claim 1 further comprising a simulation system for receiving traffic data stored in the data server and generating therefrom simulated traffic data with pre-defined incident occurrences, such that the neural network design system receives the simulated traffic data as input in optimizing the design of the updated neural network.

3. The automatic traffic incident detection system of claim 1 wherein the traffic data input to the neural network design system is formatted as rows of data set instances that include incident status, traffic volume at time instances collected at an upstream traffic measurement station, occupancy at time instances collected at an upstream traffic measurement station, traffic volume at time instances collected at a downstream measurement location, and occupancy at time instances collected at a downstream traffic measurement location.

4. The automatic traffic incident detection system of claim 1 wherein the neural network design system generates an initial population of neural network design candidates encoded in chromosomes, each candidate being assigned with a fitness value obtained from evaluation of performance, and performs a genetic evolution process of genetic reproduction on the candidates with the implementation of both the local and global searches until a stop criterion is reached to yield an updated neural network.

5. The automatic incident detection system of claim 1 wherein the incident detection processor implements a neural network by deriving neural network parameters from a coded chromosome optimized by the neural network design system, each configuration of the neural network with its associated connection weights being stored in the chromosome, whereupon a decoding function is performed to reconstruct the neural network and the traffic data at each time instance is evaluated by performing forward pass and error computation functions to assert the incident status.

6. The automatic incident detection system of claim 5 wherein neural network design parameters of the coded chromosome are stored in a binary file after being optimized and then later are input to the incident detection system for updating the neural network by replacing the existing chromosome for the neural network.

7. The automatic traffic incident detection system of claim 1 wherein the neural network design system generates an initial population of neural network design candidates encoded in chromosomes, each candidate being assigned with a fitness value obtained from evaluation of performance, and performs a genetic evolution process of genetic reproduction on the candidates until a stop criterion is reached to yield an updated neural network, the genetic evolution process being implemented by computer program instructions comprising:
  (i) instructions for generating an initial population of neural network design candidates encoded in chromosomes, each candidate being assigned with a fitness value obtained from evaluation of performance;
  (ii) instructions for ranking the initial neural network design candidates from best to worst and for maintaining a global record of the best fitness neural network design candidate so far maintained;
  (iii) instructions for performing mating population selection operations followed by crossover and mutation operations on the selected neural network design candidates to generate a new population of neural network design candidates, so that a global search has been executed via the rank-based selection, crossover and mutation operations;
  (iv) instructions for decoding each chromosome in the new population to construct a neural network and for performing at least one epoch of a back propagation training operation, so that the local search has been executed and weights of the neural network's connections are modified;
  (v) instructions for evaluating the fitness of the back-propagated neural network design candidates and, for previously decoded chromosomes, encoding design parameters back into chromosomes each having associated therewith an assigned fitness value, so that a new population of neural network design candidates is generated;
  (vi) instructions for performing a generation gap operation that selects candidates from both previous and new populations of neural network design candidates that will survive into the next evolution; and
  (vii) instructions for repeating the evolution process of genetic reproduction until a stop criterion is reached.

8. The neural network design system of claim 7, whereupon the instructions for performing at least one back propagation training operation include instructions for implementing both batch and incremental learning schemes.

9. The neural network design system of claim 7, whereupon the instructions for performing at least one back propagation training operation include instructions for performing at least one epoch of back propagation training for the best neural network design candidate so far maintained from the population previous to the new population.

10. The neural network design system of claim 7, whereupon the instructions for evaluating the fitness of the back propagated neural network design candidates include instructions for performing an actual implementation task to compute, for the neural network candidate, performance with new connection weights.

11. A computer program embodied on a computer readable medium for implementation on a computer system that automatically identifies the presence or absence of incidents of traffic congestion at given time instances, the program optimizing the design of a neural network that evaluates traffic data to determine incident status, the program comprising instructions for performing the steps of:
  (i) generating an initial population of neural network design candidates encoded in chromosomes, each candidate being assigned with a fitness value obtained from evaluation of performance;
  (ii) ranking the initial neural network design candidates from best to worst and for maintaining a global record of the best fitness neural network design candidate so far maintained;
  (iii) performing mating population selection operations followed by crossover and mutation operations on the selected neural network design candidates to generate a new population of neural network design candidates, so that a global search has been executed via the rank-based selection, crossover and mutation operations;
  (iv) performing a back propagation training operation on the neural network design candidates, so that a local search has been executed and weights of the neural network's connections are modified to generate a new population of neural network design candidates;
  (v) evaluating the fitness of the back-propagated neural network design candidates and assigning thereto a fitness value;
  (vi) performing a generation gap operation that selects candidates from the new population and previous populations of neural network design candidates that will survive into the next evolution; and
  (vii) repeating the evolution process of genetic reproduction from step (ii) to step (vi) until a stop criterion is reached.

12. The program of claim 11, wherein the step of performing at least one back propagation training operation includes for implementing both batch and incremental learning schemes.

13. The program of claim 11, wherein the step of performing at least one back propagation training operation includes instructions for performing at least one epoch of back propagation training for the best neural network design candidate so far maintained from the population previous to the new population.

14. The program of claim 11, wherein the step of evaluating the fitness of the back propagated neural network design candidates includes performing an actual implementation task to compute, for the neural network candidate, performance with new connection weights.

15. A method for identifying the presence or absence of incidents of traffic congestion at selected time instances, comprising the steps of:
  acquiring traffic data;
  storing the acquired traffic data;
  using at least one neural network for evaluating the traffic data to determine the incident status for a particular time instance; and
  updating the at least one neural network utilizing both a global search and a local search for optimizing the design of the neural network.

16. The method of claim 15 further comprising the steps of receiving traffic data stored in a data server and generating therefrom simulated traffic data with pre-defined incident occurrences, such that the simulated traffic data is used as input in optimizing the design of the updated neural network.

17. The method of claim 15 wherein the traffic data is formatted as rows of data set instances that include incident status, traffic volume at time instances collected at an upstream traffic measurement station, occupancy at time instances collected at an upstream traffic measurement station, traffic volume at time instances collected at a downstream measurement location, and occupancy at time instances collected at a downstream traffic measurement location.

18. The method of claim 15 wherein the step of updating the neural network further comprising the steps of:
   (i) generating an initial population of neural network design candidates encoded in chromosomes, each candidate being assigned with a fitness value obtained from evaluation of performance;
   (ii) ranking the initial neural network design candidates from best to worst and for maintaining a global record of the best fitness neural network design candidate so far maintained;
   (iii) performing mating population selection operations followed by crossover and mutation operations on the selected neural network design candidates to generate a new population of neural network design candidates, so that the global search has been executed via the rank-based selection, crossover and mutation operations;
   (iv) performing a back propagation training operation on the neural network design candidates, so that the local search has been executed and weights of the neural network's connections are modified to generate a new population of neural network design candidates;
   (v) evaluating the fitness of the back-propagated neural network design candidates and assigning thereto a fitness value;
   (vi) performing a generation gap operation that selects candidates from the new population and previous populations of neural network design candidates that will survive into the next evolution; and
   (vii) repeating the evolution process of genetic reproduction from step (ii) to step (vi) until a stop criterion is reached.

19. A method for constructing a chromosome string to code the architecture of a neural network used in an automatic traffic incident detection system for identifying the presence or absence of incidents of traffic congestion, and for determining the weight of each connection between neurons of the neural network, the method comprising the steps of;
   i) defining a maximum number of genes in the chromosome used for the number of hidden layers to be in the neural network;
   ii) defining the maximum number of genes in the chromosome used for the number of neurons to be in each hidden layer;
   iii) defining the maximum number of genes in the chromosome used for the existence of each particular neuron in each hidden layer;
   iv) defining the maximum number of genes in the chromosome used for the choice between three types of activation functions to be used in each neuron of the neural network;
   v) defining the maximum number of genes in the chromosome used for the weight of connections to neurons;
   vi) defining the maximum number of genes in the chromosome used for the choice of the existence of each connection between neurons;
   vii) defining the maximum number of genes in the chromosome used for the choice of the existence of input variables or input nodes; and
   viii) coding the maximum network configuration and parameters into a chromosome.

20. A method for identifying the presence or absence of incidents of traffic congestion at selected time instances, comprising the steps of:
   storing acquired traffic data;
   utilizing a global search and a local search genetic algorithm technique for optimizing the design of a neural network to be used in evaluating the traffic data;
   evaluating the traffic data using the neural network to determine the incident status for a particular time instance, the neural network being implemented by deriving neural network parameters from a coded chromosome optimized by the genetic algorithm technique, performing a decoding function to reconstruct the neural network, and performing forward pass and error computation functions to assert the incident status.

* * * * *